July 16, 1968   SHIGERU SUGANUMA   3,392,564
PROCESS AND APPARATUS FOR THE MANUFACTURE OF CIRCULAR FLANGES
Filed Sept. 3, 1965   5 Sheets-Sheet 1
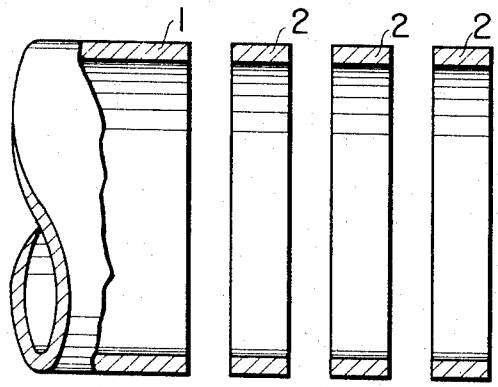
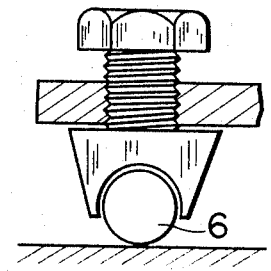
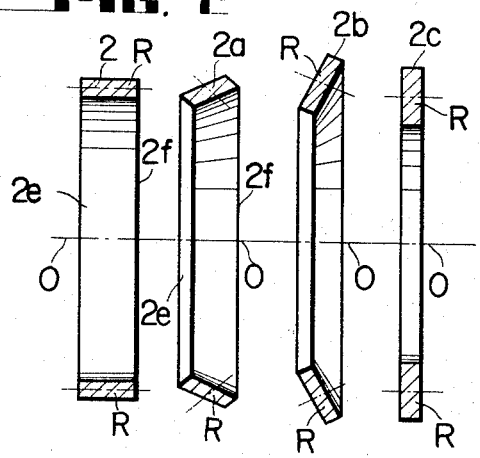
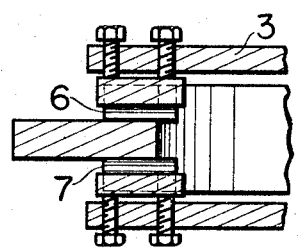
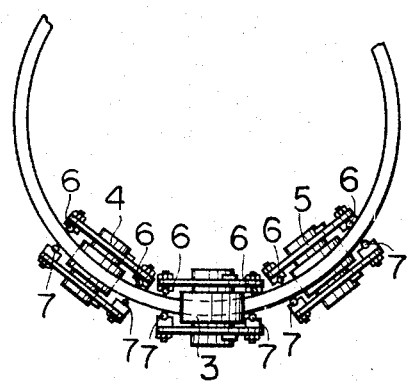
INVENTOR.
SHIGERU SUGANUMA

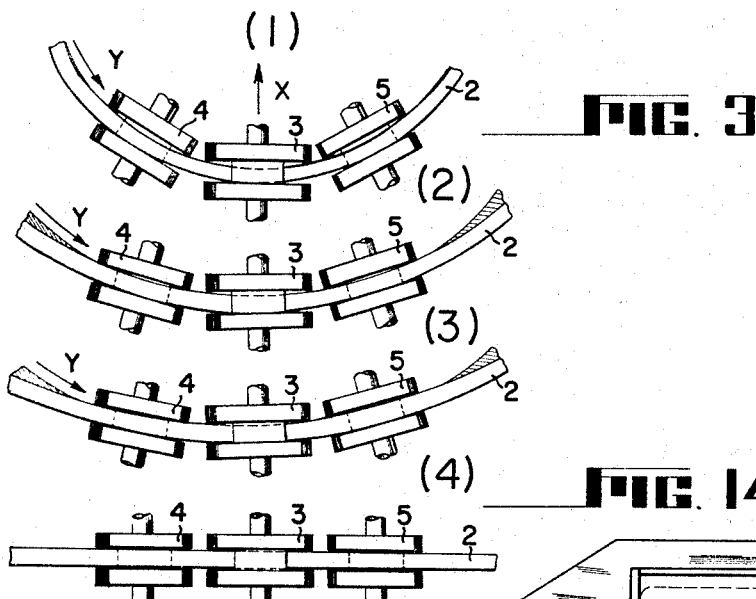
FIG. 3
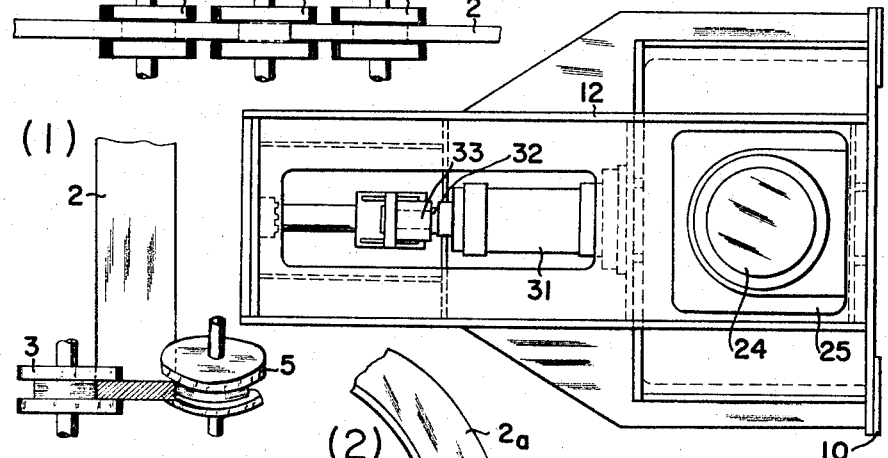
FIG. 14
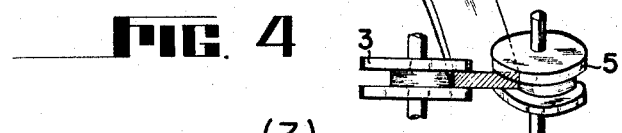
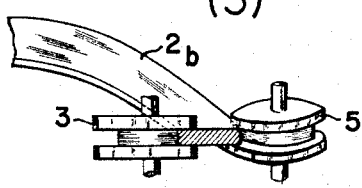
FIG. 4
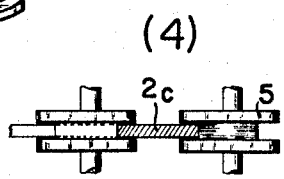

July 16, 1968 SHIGERU SUGANUMA 3,392,564
PROCESS AND APPARATUS FOR THE MANUFACTURE OF CIRCULAR FLANGES
Filed Sept. 3, 1965 5 Sheets-Sheet 3
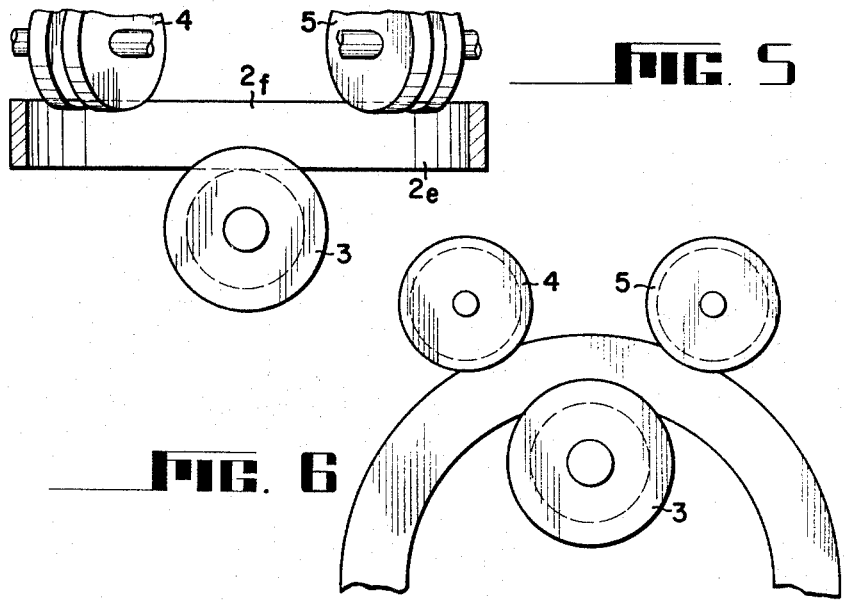
FIG. 5
FIG. 6
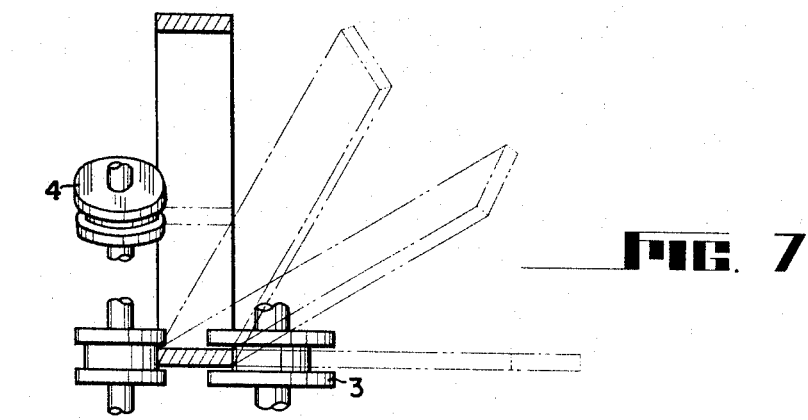
FIG. 7
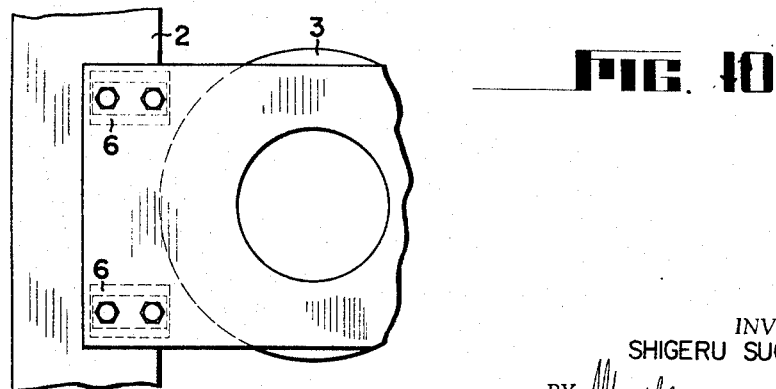
FIG. 10
INVENTOR.
SHIGERU SUGANUMA

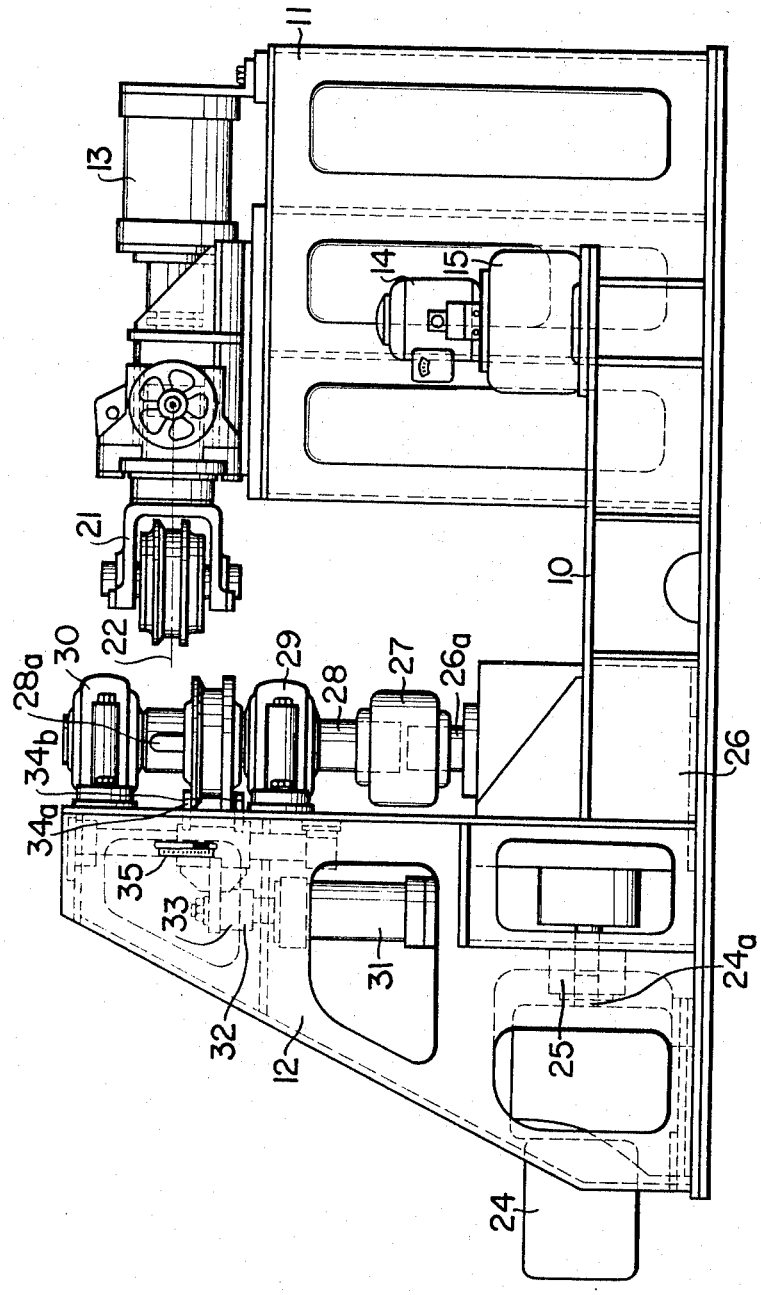

July 16, 1968 SHIGERU SUGANUMA 3,392,564
PROCESS AND APPARATUS FOR THE MANUFACTURE OF CIRCULAR FLANGES
Filed Sept. 3, 1965 5 Sheets-Sheet 5

INVENTOR.
SHIGERU SUGANUMA
BY

United States Patent Office 3,392,564
Patented July 16, 1968

3,392,564
PROCESS AND APPARATUS FOR THE MANUFACTURE OF CIRCULAR FLANGES
Shigeru Suganuma, Yokohama-shi, Japan, assignor to Nippon Kokan Kabushiki Kaisha
Filed Sept. 3, 1965, Ser. No. 484,933
5 Claims. (Cl. 72—80)

ABSTRACT OF THE DISCLOSURE

A method and apparatus for forming flat annular metal flanges is disclosed as including cutting a cylindrical ring from a length of cylindrical tubing and mounting the cylindrical ring between a working roll and a pair of supporting rolls, with the working roll engaging one axial end surface of the ring and the two supporting rolls engaging the opposite axial end surface of the ring. The two supporting rolls are spaced angularly from each other and from the angular position of the working roll, and are rotatably mounted in yokes, each of which is pivotal about a longitudinal axis.

By driving the working roll to rotate the cylindrical ring while, at the same time, changing the level of the working roll relative to the supporting rolls and moving the supporting rolls toward each other, the cylindrical ring is elastically deformed until it assumes a flat annular shape. The rolls may be double flange rolls or may have roller bearings incorporated therein for engaging the cylindrical ring.

Background of the invention

This invention relates to a novel process for the manufacture of circular flanges from tubular elements, as well as an apparatus for carrying out the process As commonly employed, conventional processes for the manufacture of circular flanges, especially those of larger diameters, comprises generally the following step: scribing concentric circles corresponding to the outer and inner diameters of the flange on an iron sheet; cutting the flange from the sheet along the scribed concentric circles by means of a cutting tool or torch flame.

This conventional process has grave drawbacks of time-consuming, lower productive efficiency and inevitable and voluminous waste material resulting therefrom. Instead of fabricating complete flanges, a modified, yet commonly known to those skilled in the art, process has been carried into practice, wherein flange segments are scribed and cut out from iron sheets and then united together, such as by the way of welding, so as to form desired products. This modified process is especially useful for the production of larger iron flanges. However, these conventional manufacturing processes can not be employed for the realization of desirable mass production of iron flanges, especially on account of uneconomical productive efficiency and unequal sizes of the products. The reducing flanges and those utilized in expansion joints, when fabricated in a similar manner, invite highly complicated productive techniques which causes higher costs of the thus manufactured products.

The main object of the present invention is to provide a unique manufacturing process for the fabrication of circular metallic flanges, including those of the reducing type, in an economical manner, thus obviating the aforementioned various drawbacks inherent in the conventional comparative technique, and a novel and improved machine for the realization of the process.

The inventive process is characterized by such a combination of the following steps: cutting a number of cylindrical ring elements having a predetermined length from a tubular stock; mounting the ring element by three rolls, one from one end and two from the opposite end of said element; exerting pressure axially of the element and at different levels at both ends of the element while rotating the latter frictionally by rotating positively said one of the rolls and keeping the remaining two rolls freely rotatable and freely pivotable; and shifting relatively said three rolls gradually towards one and the same level, until the element is transformed into a circular flange.

For the realization of the above process, the machine according to the present invention comprises a machine bed; a positively driven working roll mounted shiftably in a direction perpendicular to said bed; a pair of work-receiving or backup rolls mounted feely rotatably and pivotably, as well as shiftably in the direction at right angles to the shifting direction of said working roll; and pressure-exerting means mounted on said bed for advancing and receding said workpiece-receiving rolls towards and from said working roll, respectively. Substantially a preferred embodiment of the invention will be described more in detail hereinbelow, with reference to the accompanying drawings, in which:

FIG. 1 is a schematic sectional view showing how to prepare a number of cylindrical tube elements as the workpiece employable in the process according to this invention;

FIG. 2 is a schematic sectional view, showing the working principle of the invtntion;

Figure 13:
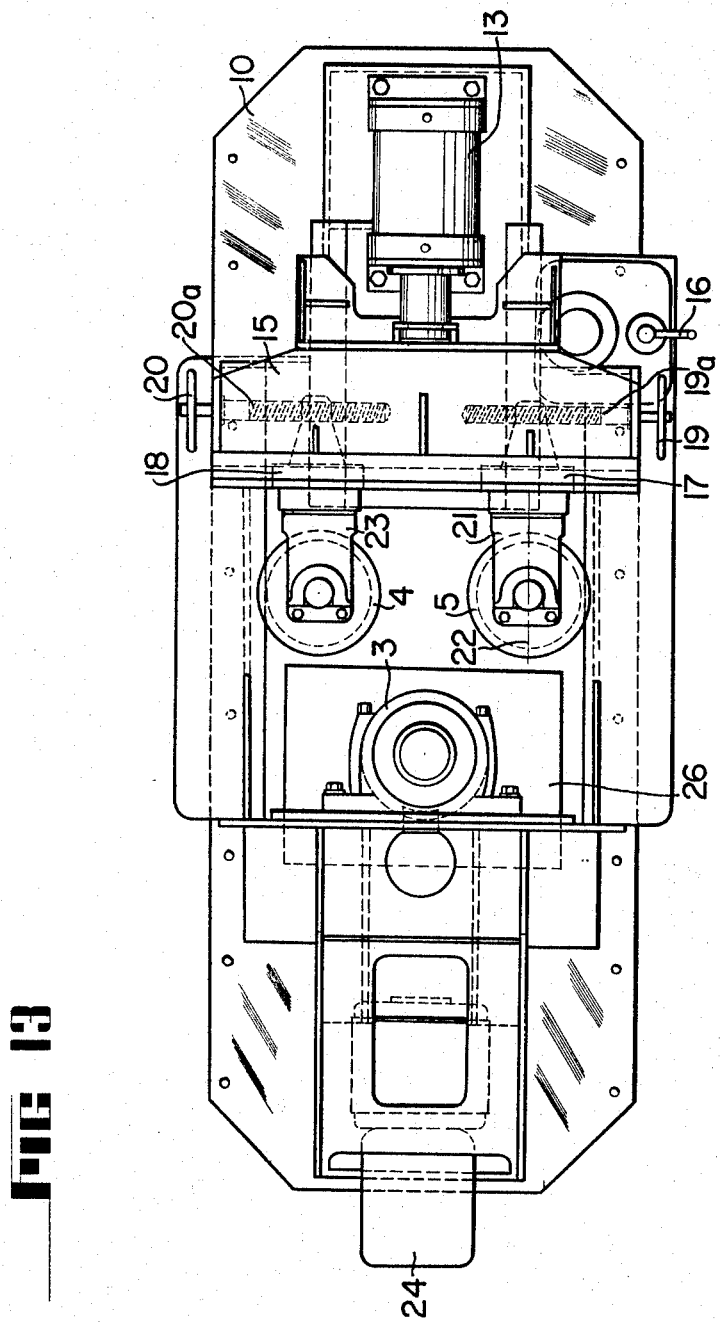

FIG. 3, (1)–(4), shows schematic successive views, illustrating the relative physical relationship between the workpiece and the roll arrangement, in several successive working stages of the novel process;

FIG. 4, (1)–(4), shows views similar and corresponding to those shown in FIG. 3, when seen in the direction perpendicular to that employed therein;

FIG. 5 is a schematic view of the roll arrangement relative to the workpiece, when seen at the initial stage of the novel process;

FIG. 6 is a similar view to FIG. 5, when seen at the final stage of the process;

FIG. 7 is a schematic and explanatory view, showing the plastic deformation of the workpiece during several successive working stages of the process;

FIG. 8 is an explanatory view similar to FIG. 3(1), showing a modified roll arrangtment wherein each roll is provided with a pair of anti-friction rollers;

FIGS 9–11 are detailed views, especially showing the working mode of the anti-friction rollers;

FIGS. 12–14 illustrate, respectively, a side view, a top plan view and an end view of a preferred machine adapted for carrying out of the novel process.

Referring first to FIG. 1 of the accompanying drawings, a tubular stock 1 is shown in its longitudinal section. In the right-hand half of FIG. 1, there are also shown a plurality of cylindrical ring elements, generally shown by a common numeral 2, cut from the stock 1. This cutting operation may be carried into effect on a conventionally available pipe cutting machine, although not shown.

The element 22, which is circular in an initial stage, is transformed, at a final stage, into a flat and circular flange 2c through a continuous plastic and rolling deformation which is illustrated in FIG. 2 schematically and exemplified by two intermediate stages. By reviewing the successive deformation as at 2, 2a, 2b, 2c of the workpiece, the basic principle embodied in the novel process can be easily understood. Specifically to demonstrate, the initial cylindrical element 2 is, at the second stage, rolled out or flared on the one hand, and rolled reducingly, on the other hand. In the third stage, this deformation is still accentuated through the plastic rolling operation, as will be more fully described hereinafter.

For carrying out the above-mentioned process, a working roll 3, preferably flanged as shown in FIG. 3 and adapted to be positively driven as will be more fully described hereinafter with reference to FIGS. 12–14, is kept in contact with one end surface 2e of the workpiece ring and then a pair of inclined abutting or receiving rolls 4 and 5 are kept in pressure contact with the opposite end surface 2f of the workpiece. These follower rolls 4 and 5 are freely rotatable and, at the same time, freely pivotable preferably about the centre of the contacting area. When thus preset, the working roll 3 is positively shifted vertically in FIG. 3, (1), as hinted by an arrow X, whereby the workpiece 2 is frictionally driven to rotate about its own axis O and, for instance, in the counter-clockwise direction as hinted by an arrow Y in FIG. 3. In this way, the workpiece is rolled in such a way that the end surface 2f kept in contact with the follower rolls 4 and 5 is bent or twisted outwardly about its neutral axis R passing through the centre of the wall and describing a peripheral circle, and thus subjected to a flaring deformation.

On the contrary, the end surface 2e of the workpiece kept in contact with the working roll 3 is bent or twisted inwardly about its neutral axis R, and thus subjected to a reducing deformation. This rolling operation is further continued beyond the elastic region of the workpiece material, and as most clearly seen from the observation of successive sketches (2)–(4) of FIG. 3, inclusive, which correspond to the intermediate steps of FIG. 2. The relative change in the roll arrangement during this rolling operation, as well as the progressive deformation can be easily understood by the observation of successive sketches (1)–(4) of FIG. 4, which correspond to those of FIG. 3. The understanding of the plastic rolling operation may be further assisted by an observation of FIGS. 5 and 6 which respectively represent the initial and the final conditions of the roll arrangement relative to the workpiece. The progressive deformation of the workpiece is also shown in FIG. 7.

At the final stage, the workpiece has been transformed into a circular flange which is naturally the desired product.

In the modified roll arrangement shown in FIGS. 8–11, each of the rolls is fitted with two pairs of anti-friction guiding means, preferably shaped into guide rolls 6 and 7, instead of employing the flanged construction as was shown and described hereinbefore. These rollers may act, in a more efficient manner, than the flanges fitted to the aforementioned working and follower rolls.

Next, the invention can be more easily understood with reference to the following numerical examples:

*Example 1*

A tubular steel element, having an internal diameter of 1500 mm., wall thickness of 20 mm., and tube length 80 mm., respectively, was used. Each of the working and follower rolls had an equal flange diameter of 350 mm.; the diameter of the roll proper amounted to 300 mm. The distance of the followers (center-to-center) was 560 mm. The element was caught by these three rolls as described hereinbefore and the workpiece was positively rotated at a speed of 15–20 revolutions per minute. After rolling under these operating conditions for 15 minutes, the stock was perfectly transformed into a flat and circular flange; O.D. 1580 mm.; I.D. 1430 mm.; width: 76 mm. The follower rolls were advanced to the workpiece and kept hydraulically in contact therewith at a backing pressure of 15 tons.

*Example 2*

A similar cylindrical stock, yet having a length of 100 mm., was employed. The follower rolls were arranged unsymmetrically relative to the working roll with a relative distance ratio 330 mm.: 350 mm., which means the distance between the two follower rolls amounted to 680 mm. The hydraulic backing pressure was 30 tons and the workpiece was frictionally rotated at a higher speed of 25 r.p.m. The processing period amounted to 25 minutes. The final product was: I.D. 1,424 mm.; O.D. 1,604 mm.; width: 90 mm.

As will be understood, the larger the distance between the follower rolls, the smaller the backing roller pressure.

Referring finally to FIGS. 12–14, a preferred embodiment of the machine adapted to carry out the process described so far will be explained more in detail hereinbelow:

The machine comprises a machine bed 10 which is formed integrally with a front stand 11 and a rear stand 12, thus representing substantially a U in its side elevation as shown in FIG. 12.

On the front stand, there is fixedly mounted a double-acting hydraulic cylinder 13 which is hydraulically connected with a motor-driven hydraulic pump 14, although the necessary piping is not shown in the drawings. The pump with its driving electric motor 15, only schematically represented, is rigidly mounted on the bed 10. The electric wiring system for the motor leading to an A.C. power source, not shown, is omitted from the drawings for the simplicity thereof.

A main slide 15 which is mounted on the front stand slidably in the longitudinal direction of the machine, or rearwardly or forwardly of the machine bed, by manipulating a control lever 16 through conventional, thus not shown, valve means.

Cross-slides 17 and 18 are mounted on the main slide 15 and shiftable crosswise of the machine by manipulating hand wheels 19 and 20, respectively. For this purpose, spindles 19a and 20a of the wheels are kept in threaded engagement with female threads formed in projections of the cross-slides. Thus, by a manipulation of lever 16 in one or another direction so as to actuate hydraulically the cylinder 13, the main slide 15 is caused to advance towards the rear end of the machine bed, or to recede in the opposite longitudinal direction on the front stand 11. By manipulating the hand wheel 19 or 20, in one or another direction, the cross-slide 17 or 18, respectively, is caused to advance inwardly, or outwardly, of the machine bed 10.

Cross-slide 17 mounts a supporting yoke 21 which is pivotal about a horizontal axis 22 parallel to the longitudinal axis of the machine. In the similar way, another cross-slide 18 carries a yoke 23 pivotal about a horizontal axis parallel to the axis 22. Yokes 21 and 23 carries flanged follower rolls affixed with the same reference numerals 5 and 4, respectively. These rolls are freely rotatable as already set forth hereinbefore with reference to FIGS. 3–7.

Main driving geared electric motor 24, say 10 H.P., is mounted on the lower part of the rear stand 12, the output shaft 24a being connected through shaft coupling 25 to a planetary reduction gearing 26. The constituents 24–26 are, however, shown only schematically on account of their conventional nature. The output shaft 26a of the gearing is operatively connected through shaft coupling 27 with a vertical shaft 28 which is mounted rotatably in a pair of bearings 29 and 30 mounted in turn rigidly on the rear stand 12. A flanged working roll, which is attached with same reference numeral 3 as, before is slidably mounted on the shaft 28 which is formed with a key groove 28a for this purpose, the roll 3 being provided with a slidable key cooperating with the groove although not shown, thus the roll being positively prevented from any turning movement relative to shaft 28.

On the other hand, the stand 12 mounts a double-acting hydraulic cylinder 31 vertically arranged, which is provided with a cooperating hydraulic piston although not shown, the latter being rigidly connected as conventionally with a piston rod 32 carrying rigidly thereon an actuator 33, from which extend a pair of projections 34a and 34b kept in physical contact with the outside surfaces of the end flanges of the roll 3.

Thus, by manipulating a control lever which is not shown and may be constructed in the similar manner as at 16, so as to lower or elevate hydraulically the hydraulic piston, motion is transmitted therefrom through actuator 33, operating projections 34a and 34b and the flanges of the roll 3 to the latter, whereby the latter is caused to move downwardly or upwardly, as the case may be. In this way, the roll 3 may be elevated vertically from its starting operation position as shown in FIG. 12 towards the final operating position at a level equal to that including the axes of the both follower rolls 4 and 5.

When it is desired to manufacture a flat and circular flange on the aforementioned rolling machine, the working roll 3 is positioned at a predetermined level by hydraulically actuating the double-acting cylinder 31 in one or another direction. When it arrives at the desired level, the hydraulic piston is kept at the hydraulically balanced position so as to keep the roll at the desired level. Then, the motorized pump 14 is actuated and control lever 16 is manipulated so as to hydraulically pressurize the cylinder 13 for advancing the hydraulic piston and the main slide 15 to a desired working position, after the cross-slide 17 and 18 has advanced inwardly or retarded outwardly in the traverse direction relative to the working roll 3, by manipulatingly adjusting the related hand wheels 19 and 20, respectively. In this way, the workpiece is caught positively by the three rolls 3, 4 and 5 under pressure as was described hereinbefore. Then, the main motor 24 is energized by A.C. current so as to start, whereby the working roll 3 is positively driven and thus the workpiece is caused to rotate frictionally, as was described hereinbefore. The operator operates the control means similar to that denoted by 16, so as to supply oil pressure to the cylinder space beneath the hydraulic piston in the double-acting cylinder 31, for gradually elevating the actuator 33 through the intermediary of piston rod 32. For this purpose, an indicator 35 is fitted on the rear stand 12 and the correct level of the actuator, and thus of the working roll 3, can be precisely determined by observation of the indicator.

By this operation, the workpiece is rolled in the way as was described with reference to FIGS. 2–7.

At the final stage of the rolling operation, the workpiece 2 having originally a cylindrical ring shape has been transformed into a flat and circular flange product 2c.

Upon thus being completely fabricated, the product 2c is released by returning the follower or backing rolls 4 and 5 hydraulically rightwards in FIG. 12 by manipulating control lever 16 as will be easily understood from the foregoing description.

In FIGS. 12 and 13, the follower rolls 4 and 5 are shown at the final stage of the rolling operation. As will be understood, these rolls have initially a largest inclined angle relative to the working roll 3 and gradually approach to their horizontal or final position shown in FIGS. 12 and 13. This movement is easily realized by the swivelling construction of roll-supporting yokes 21 and 23 about their horizontal axes 22 and the like.

Although only several preferred embodiments have been described, various modifications and alterations may occur to those skilled in the art. For instance, the working roll may be hydraulically backed up, instead of the follower rolls. In this modified arrangement, the working roll together with its driving motor and transmission gearing is arranged on a slide which is slidable horizontally on the rear stand, or alternatively, directly on the machine bed. If desired, the hydraulic back-up arrangement may be replaced by manually operable screw means, a spring back-up mechanism or the like conventional means.

In the foregoing the invention has been described in reference to substantially a specific illustrative machine and several numerical examples of the novel manufacturing process. As will be understood, various changes may be made in the form of details, arrangement and proportion of the parts, etc., without departing from the broader spirit and scope of the invention as set forth in the appended claims.

I claim:
1. A process for manufacturing circular flanges, comprising the steps of: cutting a number of cylindrical ring elements, having a predetermined length, from a tubular stock; mounting a ring element by three rolls, one from one end and two from the opposite end of said element; exerting pressure axially of the element and at different levels at both ends of the element while rotating the latter frictionally by rotating positively said one of the rolls and keeping the remaining two rolls freely rotatable and freely pivotable; and shifting relatively said three rolls gradually towards one and the same level, until the element is transformed into a circular flange.

2. Machine for carrying out the process of manufacturing circular flanges comprising a machine bed; a positively driven working roll mounted shiftably in the direction perpendicular to said bed; a pair of workpiece-receiving back-up rolls mounted freely rotatably and pivotably, as well as shiftably in the direction at right angles to the shifting direction of said working roll; and pressure-exerting means mounted on said bed for advancing and receding said workpiece-receiving rolls towards and from said working roll, respectively.

3. Machine as set forth in claim 2, wherein said pressure-exerting means is a double-acting hydraulic cylinder.

4. Machine as set forth in claim 2, wherein each of said workpiece-supporting rolls is mounted on a cross-slide which is in turn mounted on a main slide shiftable longitudinally of the machine.

5. Machine as set forth in claim 2, wherein the working roll is slidably arranged on a rotatable vertical shaft which is connected through gearing and shaft-coupling to a main driving motor mounted on the machine bed.

References Cited

UNITED STATES PATENTS 1,904,734   4/1933   Schcaa _____ 72—91

FOREIGN PATENTS 546,084   7/1956   Italy.

CHARLES W. LANHAM, *Primary Examiner.*

RONALD D. GREFE, *Examiner.*